(12) United States Patent
Son et al.

(10) Patent No.: US 6,593,994 B2
(45) Date of Patent: Jul. 15, 2003

(54) MULTI-LAYER IMAGE DISPLAY SYSTEM AND METHOD THEREOF

(75) Inventors: Jung Young Son, Sungnam-si (KR); Yong Jin Choi, Sihung-si (JP); Yuri N. Gruts, Seoul-si (KR)

(73) Assignee: Korea Institute of Science & Technology, Seoul (KR)

( * ) Notice: Subject to any disclaimer, the term of this patent is extended or adjusted under 35 U.S.C. 154(b) by 0 days.

(21) Appl. No.: 09/866,684

(22) Filed: May 30, 2001

(65) Prior Publication Data

US 2002/0159032 A1 Oct. 31, 2002

(30) Foreign Application Priority Data

Mar. 14, 2001 (KR) .......................................... 2001-13214

(51) Int. Cl.[7] .............................................. G03B 35/02
(52) U.S. Cl. ................................ 352/65; 352/57; 353/7; 353/10
(58) Field of Search ............................... 352/43, 57, 69, 352/62, 65; 353/10, 7; 348/44, 42; 359/478, 479

(56) References Cited

U.S. PATENT DOCUMENTS

| | | | |
|---|---|---|---|
| 1,971,234 A | * 8/1934 | Peppercorn | 352/43 |
| 3,592,536 A | * 7/1971 | Licitis et al. | 352/57 |
| 3,963,332 A | * 6/1976 | Sheldon et al. | 352/60 |
| 3,970,361 A | * 7/1976 | Di Matteo et al. | 359/478 |
| 4,669,812 A | * 6/1987 | Hoebing | 359/20 |
| 5,813,742 A | * 9/1998 | Gold et al. | 345/4 |
| 5,883,695 A | * 3/1999 | Paul | 348/44 |
| 6,109,750 A | * 8/2000 | Mayer et al. | 353/7 |

* cited by examiner

Primary Examiner—Russell Adams
Assistant Examiner—D. Ben Esplin
(74) Attorney, Agent, or Firm—Birch, Stewart, Kolasch & Birch, LLP

(57) ABSTRACT

A multi-layer image display system and method thereof, in which liquid crystal type image display units for displaying the images according to depth necessary for obtaining the stereoscopic image are arranged according to layers at a predetermined interval without overlapping each other along the rotary axis and rotated as displayed the layer image corresponding to each image display unit, by which the screen is on to express the stereoscopic image when each image display unit arrives at the user's position; and another method in which the reflector or half mirror is installed instead of the image display unit and the layer image corresponding to the relative depth of the reflector or half mirror is synchronized with the rotation speed to express the stereoscopic image in the fixed high speed display device. The stereoscopic image obtained by the multi-image capable of corresponding to the four optical functions of the eyes such as binocular parallax and moving parallax for providing the first depth recognition function of the eyes and convergence and accommodation for providing the fine depth recognition function used for recognizing the relative position of the specific image according to depth more correctly, so that fatigue of the eyes incurred in watching the stereoscopic image can be prevented.

40 Claims, 10 Drawing Sheets

MULTI-LAYER IMAGE DISPLAY SYSTEM AND METHOD THEREOF

BACKGROUND OF THE INVENTION

1. Field of the Invention

The present invention relates to a multi-layer image display system and method thereof, in particular, which can display a three-dimensional image according to depth so that the three-dimensional image can be transferred to a user without incurring eyestrain.

2. Description of the Related Art

In general, the most prominent problem is eyestrain in obtaining the three-dimensional image. It is due to the fact that an electronically realizable three-dimensional image display mechanism of the related art does not enable the three-dimensional image to correspond to all of the basic optical functions of eyes. Furthermore, the three-dimensional image display mechanism of the related art restricts a viewing zone or a zone viewable of the three-dimensional image thereby adding inconvenience in viewing posture.

A majority of three-dimensional image display systems of the related art take pictures of a plane image of an object, which is to be displayed into the three-dimensional image, by using at least two cameras horizontally arranged at a predetermined interval considering compatibility with conventional two-dimensional plane image display systems. Then, the system projects the plane image on a visual zone defining screen according to time or space splicing or directly displays the plane image on a display device with a visual zone defining optical plate to obtain the plane image of the object three-dimensionally so that the three-dimensional image can be recognized. The three-dimensional image display system using this mechanism allows eyes to sense depth through the plane image by using binocular parallax or binocular parallax together with moving parallax.

Therefore, even if the plane image is recognized as the three-dimensional image due to parallax, the image itself is a plane image focused to the surface of a screen or a display device, and thus fails to correspond to other functions of the eyes such as convergence and accommodation. Namely, since the image can be vague and unseen due to the operation of the functions such as convergence and accommodation when a line of sight is moved from the screen or the display device, the eyes should repeatedly focus on the screen or the display device surface. Therefore, repeated movement of the eyes is required to recognize the three-dimensional image through the three-dimensional image display system of the related art thereby incurring eyestrain or fatigue to the eye.

Methods for producing a depth-sensible display image have been proposed to overcome the foregoing problem. The methods include a method of electrically displaying a hologram and a volumetric image method for displaying layers divided according to depth.

The hologram method, however, requires that the display panel and a photographing device have similar size and a predetermined area of high definition is ensured since a angular field decreases according to expansion of a hologram. Such requirements cannot be electronically realized at the present.

Also, the volumetric image method includes a method of projecting the images according to layers synchronized with a rotating helical screen, a variable-focal mirror method of reciprocating a spherical mirror synchronized with the images according to layers, a Laser Scanning Volumetric Imagine System, and the like. However, these methods are based upon the image projection and do not sufficiently use the previous flat panel display device such as an LCD or the CRT.

Besides, while a number of LCD panels can be arranged by using the conventional flat panel device, the LCD panels are required as many as the images according to layers. Therefore, light efficiency is very low and other display devices rather than LCD cannot be adopted.

SUMMARY OF THE INVENTION

The present invention is proposed to solve the foregoing problems of the related art, and it is therefore an object of the invention to provide a multi-layer image display system and a method thereof which can obtain a three-dimensional image corresponding to four basic optical functions including binocular parallax, moving parallax, convergence and accommodation to prevent eyestrain.

According to an embodiment of the invention to obtain the object, it is provided a multi-layer image display system comprising: a plurality of plates rotating in sequence about a rotary axis; a plurality of image display units mounted to said plurality of plates toward a user side for displaying an image; and a plurality of light source units placed in positions corresponding to said plurality of image display units as opposed to the user side about said plurality of plates for illuminating said image display unit, and a method thereof comprising the following steps of: (a) generating the multi-layer image sampled from a stereoscopic image according to depth to display the stereoscopic image; (b) displaying layer images composing the multi-layer image generated in said step (a) to image display units mounted to a plurality of rotary plates according to depth without overlapping; and (c) stereoscopically transferring the images of the image display units to a user.

According to another embodiment of the invention to obtain the object, it is provided a multi-layer image display system comprising: a plurality of plates rotating in sequence about a rotary axis; an image projection screen unit mounted to said plurality of plates for allowing an image to be projected; and a plurality of projectors for projecting the image to said image projection screen unit, and a method thereof comprising the following steps of: (a) generating the multi-layer image sampled from a stereoscopic image according to depth for displaying the stereoscopic image; (b) projecting from a plurality of projectors layer images according to depth so that the layer images composing the multi-layer image generated in said step (a) are generated with depth difference; and (c) stereoscopically transferring the layer images to a user as a plurality of image projection screen units corresponding to a plurality of projectors rotate without overlapping with one another and the layer images projected from the projectors are formed on the image projection screen units.

According to further another embodiment of the invention to obtain the object, it is provided a multi-layer display system comprising: a plurality of image display units for displaying a plurality of layer images composing a multi-layer image; a reflecting means for reflecting the layer images, whereby the layer images displayed from said image display unit are obtained in a multi-layered manner so that a user can stereoscopically see the layer image; and a rotary means for rotating said reflecting means to sequentially reflect the plurality of layer images displayed on said plurality of image display units, and a method thereof comprising the following steps of: (a) generating the multi-layer image sampled according to depth from a stereoscopic image to express the stereoscopic image; (b) displaying layer images composing the multi-layer image on image display units; (c) reflecting the layer images displayed in said step (b) through a plurality of reflecting means rotating without overlapping; and (d) stereoscopically transferring the layer images to a user as the layer images are reflected through the plurality of reflecting means in said step (c) and obtained in a multi-layered manner.

DETAILED DESCRIPTION OF THE PREFERRED EMBODIMENT

Hereinafter, a multi-layer image display system according to the first embodiment of the invention will be described in detail in reference to FIG. 1 to FIG. 3.

Figure 1:
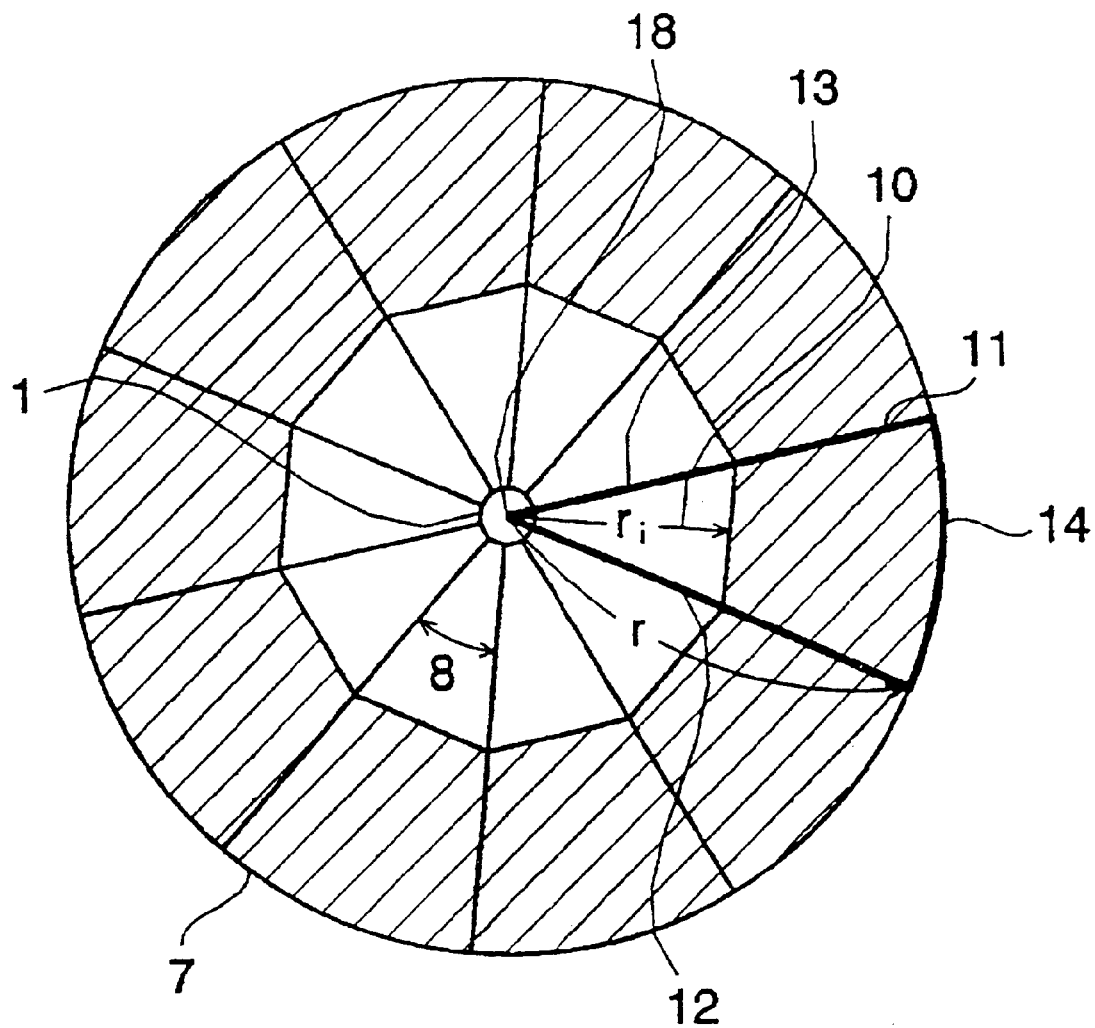
FIG. 1 is a plan view for showing the principle of a multi-layer image display system according to the first embodiment of the invention.
Figure 2:
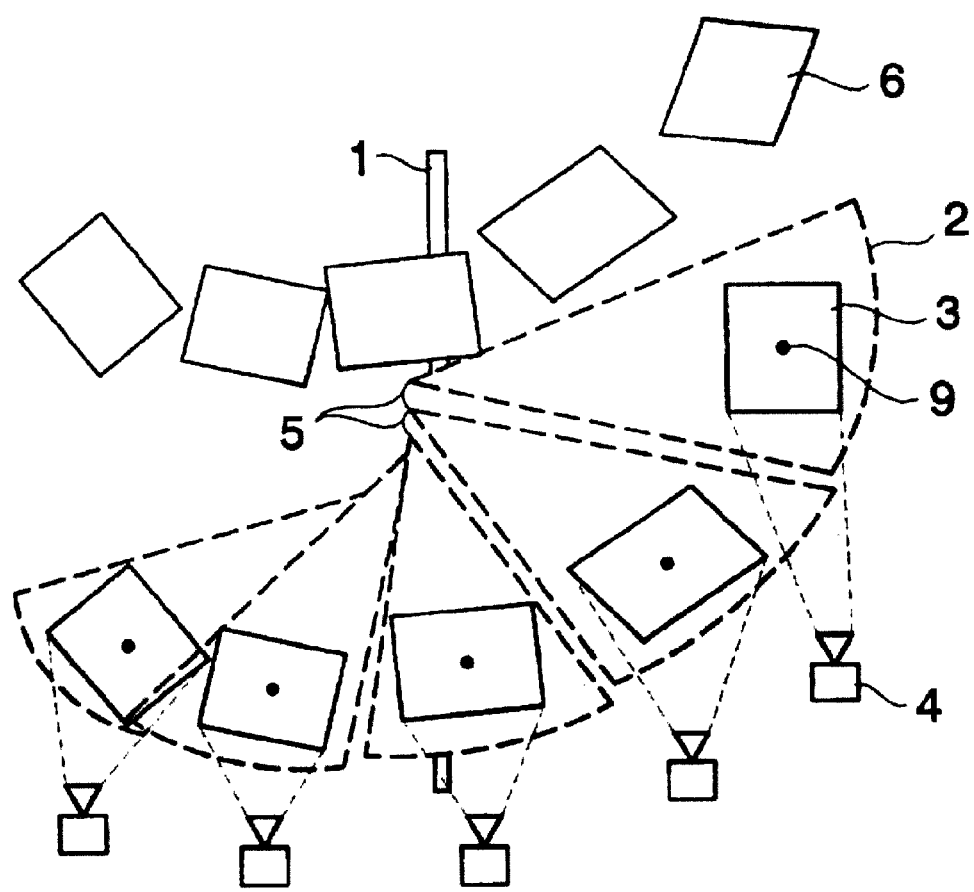
FIG. 2 shows the construction of the multi-layer image display system shown in FIG. 1.

FIG. 1 shows the principle of the multi-layer image display system according to the first embodiment. A plurality of fan-shaped plates 2 with the same shape are arranged in parallel without overlapping at a predetermined height interval 5 around a rotary axis 1, and an image display unit 3 for back light illumination such as liquid crystal is placed on each plate, by which layer images corresponding to relative positions of the fan-shaped plates 2 or images sampled according to depth from a stereoscopic image are displayed, and a flash-type light source unit 4 illuminates when each of the image display units 3 arrives at a window 6 placed at the position of a viewer, then layer images mutually different in depth arrive at the position of the window with a time difference of 1/60N second (N means the number of the layer images to be displayed) to transfer a stereoscopic image without flickering.

The interval between each layer image is not required to be the same, and can be varied according to the features of the image wanted to be displayed. Also, the time difference 1/60N is based upon screen brightness of a typical CRT TV and can be varied according to brightness of the image display unit 3.

Here, the plurality of fan-shaped plates 2 arranged about the rotary axis are a circle 7 with a certain radius divided into a same central angle 8 when seen from above. Here, the light source units 4 are positioned under the plate mounted with the image display unit for displaying a layer image in the lowest position about the rotary axis 1 and arranged at the central position of the image display unit mounted to the outside of each of the fan-shape plate 2 so that a user watches the three-dimensional image the same at the position corresponding to the position of each light source unit 4. The window 6 corresponding to the position of each light source unit 4 is for protecting the image display unit 3 and can be installed if necessity.

Also, the fan-shape plates 2 are narrowed in width as approaching the rotary axis 1, and an area capable of installing the image display unit 3 with a constant aspect ratio is defined within a diagram 34 obtained from a straight line 10 connecting two sides 12 and 13 of a fan-shaped area give with a length $r_i$ from the center 18 of the rotary axis 1 and sides 11 and an arc 14 of a fan-shaped area with a length r from the center 18 as shown in FIG. 1.

In the fan-shaped plate 2, there are two methods in setting the area of the image display unit 3 or a rectangle 16 given with an aspect ratio $A_s$ and a length w.

Figure 3:
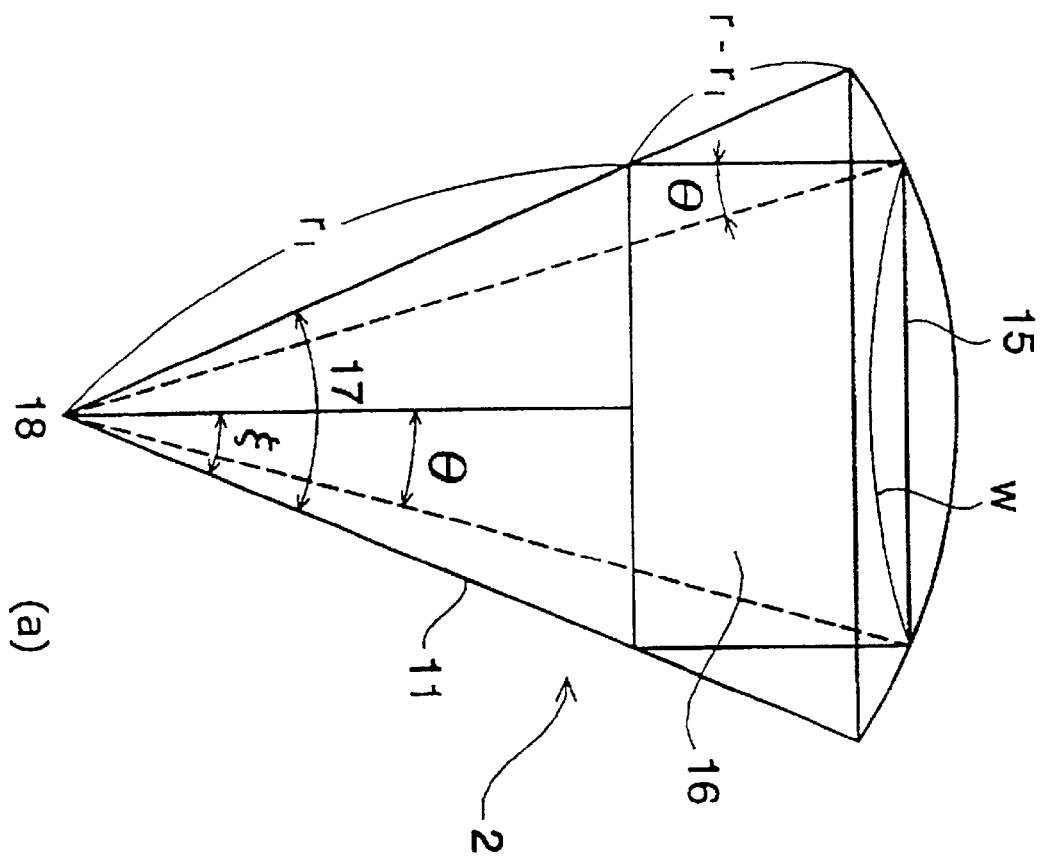
FIG. 3 shows the area of an image display unit mountable to a plate, which is shown in FIG. 2.
Figure 3:
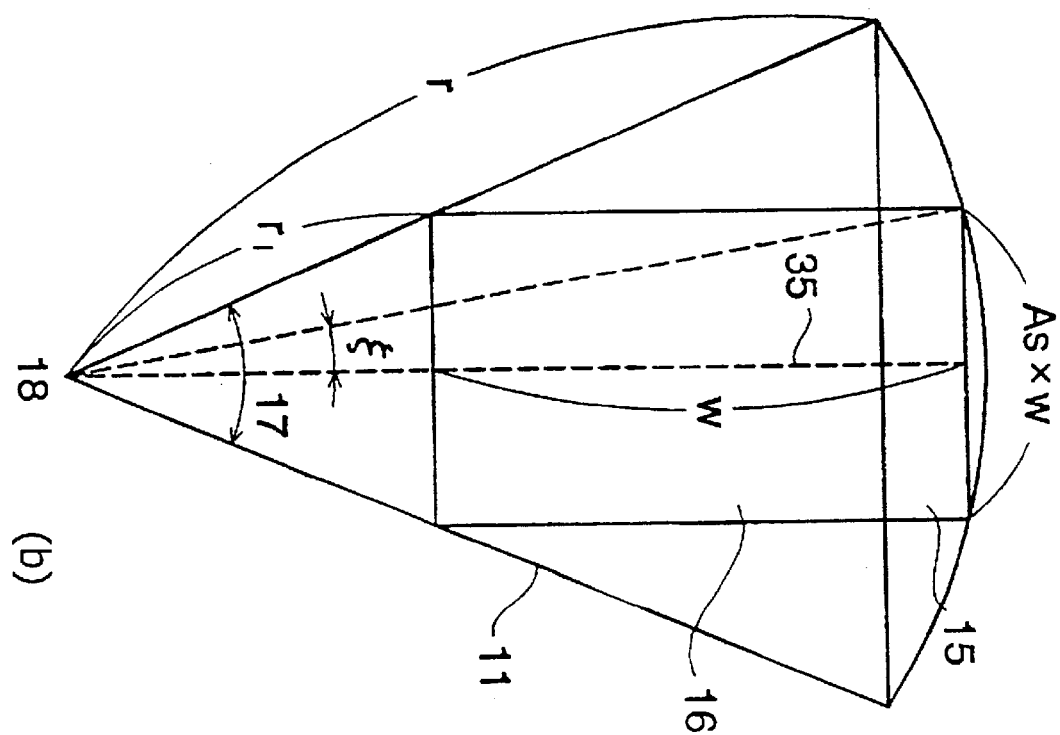

First, as shown in (a) of FIG. 3, the central radius 35 of the fan-shape area or the line for bisecting the central angle 17 is perpendicular to the lateral width 15 of the rectangle 16, in which w and r have the following relation according to Equation 1-a:

$$w = \frac{r}{\sqrt{A_s^2 + A_s \cot\xi + (\csc^2\xi)/4}}.$$ Equation 1-a

Second, as shown in (b) of FIG. 3, the central radius 35 of the fan-shape area or the line for bisecting the central angle 17 is parallel with the horizontal width 15 of the rectangle 16, in which w and r have the following relation according to Equation 1-b:

$$w = \frac{r}{\sqrt{1 + A_s \cot\xi + (A_s/2)^2 \csc^2\xi}}.$$ Equation 1-b

In Equation 1-a and Equation 1-b, each $\xi$ is given ½ of the central angle 17 of the fan-shape plate 2, and the central angle 17 is given 360/N when the number of the layer images to be displayed is N. If $A_s$ is ¾ and N is 8, w is about 4/2.02 in Equation 1-a, and r/1.94 in Equation 1-b. Thus, Equation 1-b can express the same image size with a smaller fan-shaped plate than Equation 1-a. If w is 40 cm, the sides of the fan-shaped area is about 81 cm according to Equation 1-a, and about 78 cm according to Equation 1-b. In Equation 1-a and Equation 1-b, w designates the maximum width of the image display unit which can be installed in the fan-shaped plate having the side r given with the central angle 2$\xi$, which corresponds to the maximum value of $r-r_i$.

The maximum value of $r-r_i$ is expressed by Equation 2-a in the case of Equation 1-a, and by Equation 2-b in the case of Equation 1-b:

$$r - r_i = r - \frac{w}{2\sin\xi}, \text{ and}$$ Equation 2-a

-continued $$r - r_i = r - \frac{A_s w}{2\sin\xi}.$$ Equation 2-b

Hereinafter a multi-layer image display system according to the second embodiment of the invention will be described in detail in reference to FIG. 4.

In the first embodiment, it is required to rotate the image display unit at a high speed to realize the stereoscopic image in the multi-layer image display system. However, it is not always preferred to directly rotate the image display unit since the image display unit may burst or break from excessive centrifugal force when rotated at a high speed and may also be difficult to connect with a driving circuit.

Instead, the multi-layer image display system according to the second embodiment rotates an image projection screen unit rather than directly rotating the image display unit, and an image is projected from the image display unit when the image projection screen unit arrives at a predetermined position.

Figure 4:
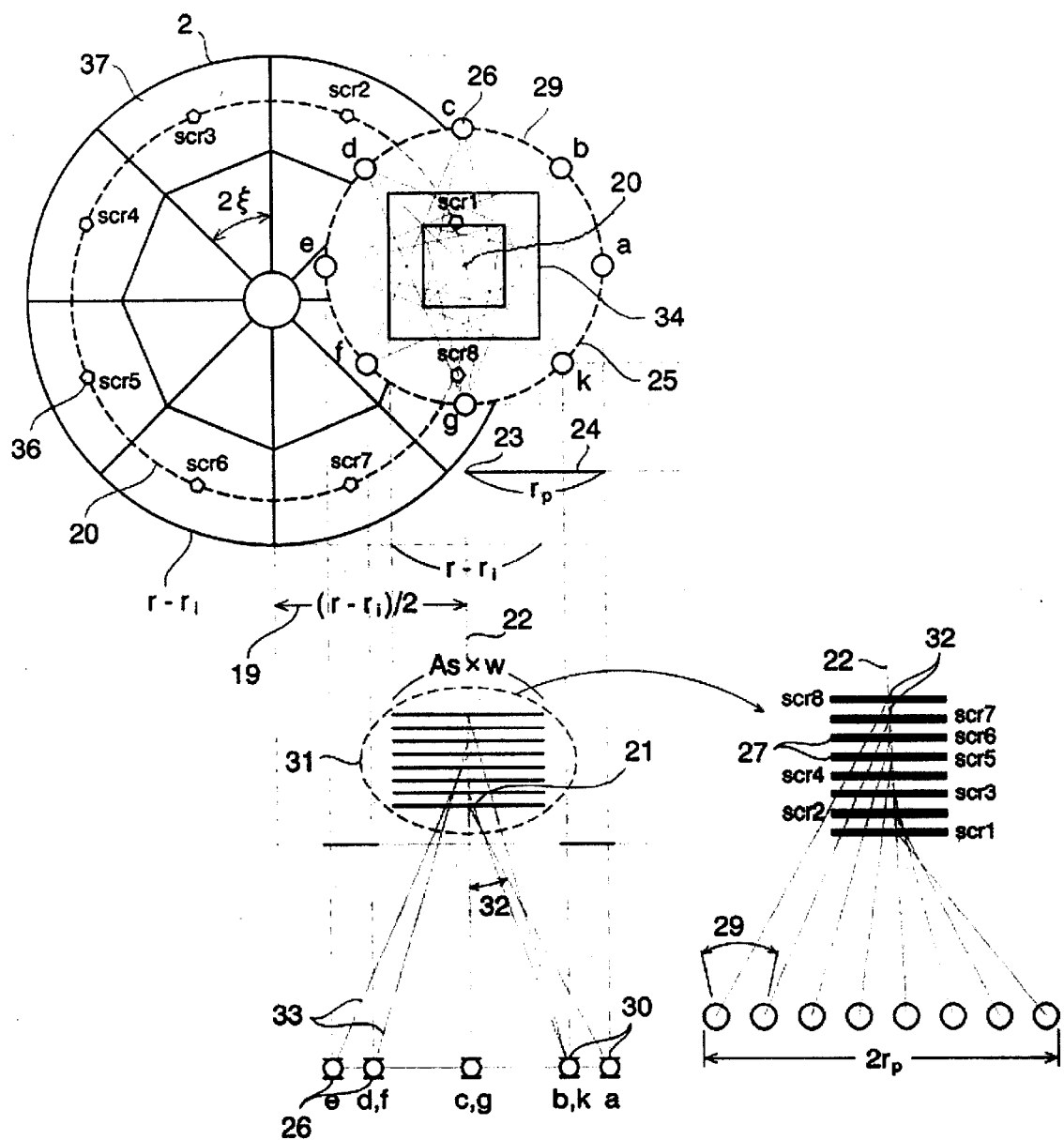
FIG. 4 shows the principle of a multi-layer image display system according to the second embodiment of the invention.

The multi-layer image display system for obtaining the multi-layer image by using projectors corresponding to the number of the image projection screen units, e.g., scr1 through scr8, and images-by-layers is shown in FIG. 4. In the exemplary embodiment shown, eight fan-shaped plates 2 are arranged about a rotary axis in parallel with respect to each other at a constant height interval therebetween and without overlapping each other, e.g., as shown in FIG. 2. The centers of projection objectives 26 of eight projectors are placed at a same interval 29 on a circumference 25 with a radius 24 of $r_p$ about one point 23 on a vertical line 22 perpendicular to the fan-shape plate 2 passing through one point 21 on a circumference 20 with a radius 19 of $(r+r_i)/2$ from the center 18 of the rotary axis 1 or along the diameter of the circumference 25 at the same interval 29.

An optical axis 33 of each projection objective 26 is in alignment with a point 27 where each corresponding fan-shaped plate 2 meets the vertical line 22. Each projection objective 26 is mounted with a high speed electronic driving shutter 30 such as a liquid crystal shutter as overlapped with the point 27. An image projection screen unit 37 is attached in a region between r and $r_i$ in each fan-shaped plate 2, and the center 36 of the image projection screen unit 37 is on the circumference 20. The optical axis 33 of each projection objective 26 is in alignment with the point 27 meeting the corresponding fan-shaped plate 2.

The driving shutter 30 is turned on only when the center 36 of each image projection screen unit 37 is in alignment with the optical axis of the corresponding projection objective 26 and allows the image to be projected on the screen so that a volumetric image 31 having an eight layered, multi-layer image when each image projection screen unit 37 is completely overlapped at a predetermined interval with a time difference. In the radius $r_p$ and the interval 29, an incident angle 32 or an angle of the optical axis of each projection objective with the vertical line 22 is required within the range that does not incur keystone distortion.

The image projected on each image projection screen unit 37 is stretched along a specific direction by the incident angle 32 or the angle between the optical axis 33 of each projection objective and the line 22 passing through the center 36 of the image projection screen unit 37 while being perpendicular thereto. If the incident angle 32 is α and α is on the plane bisecting the length of the lateral side of the image, the image projected on the image projection screen unit 37 is stretched as much as 1/cos α in the longitudinal direction. Therefore, the radius of the fan-shaped area necessary in practice should be changed considering the cos α factor as in Equation 3-a and Equation 3-b:

$$w = \frac{r}{\sqrt{(A_s/\cos\alpha)^2 + A_s\cot\xi/\cos\alpha + (\csc^2\xi)/4}}, \text{ and} \quad \text{Equation 3-a}$$

$$w = \frac{r}{\sqrt{1 + A_s\cot\xi/\cos\alpha + (A_s/2\cos\alpha)^2\csc^2\xi}}. \quad \text{Equation 3-b}$$

If $A_s$ is ¾, N is 8 and α is 50° in Equation 3-a and Equation 3-b, w is about r/2.43 (in Equation) 3-a and 2.48 (in Equation 3-b). Thus, it can be understood that the fan-shaped plate requires a smaller central radius in Equation 3-a than in Equation 3-b. The central radii of the fan-shaped plate calculated in Equation 3-a and Equation 3-b are varied according to the value of α, in which the value of r according to Equation 3-b is further decreased if α is the same or under 41.41 and the degree of decreasing increases as the value of α decreases. If α is at least 41.41, the value of r according to Equation 3-a is more decreased, and the degree of decreasing increases as the value of α increases.

The multi-layer image display system according to this embodiment of the invention utilizes a window 34 larger than the layered, maximum displayable images within the circumference 25. The user is able to see the image through the window 34 so that other mechanical parts of the multi-layer image display system of the second embodiment are hidden from view.

Hereinafter, a multi-layer image display system according to the third embodiment of the invention will be described in detail in reference to FIG. 5 to FIG. 7.

The foregoing multi-layer image display system according to the second embodiment requires as many projectors as the images-by-layers. In order to reduce the number of the projectors, a high speed image display device having a driving speed corresponding to the multiple number of the required projectors rather than one driving speed of one projector is required. One of the methods obtaining the volumetric image using this high speed driving display device is to shed the image of the driving display device through at least one reflector or half mirror.

Figure 5:
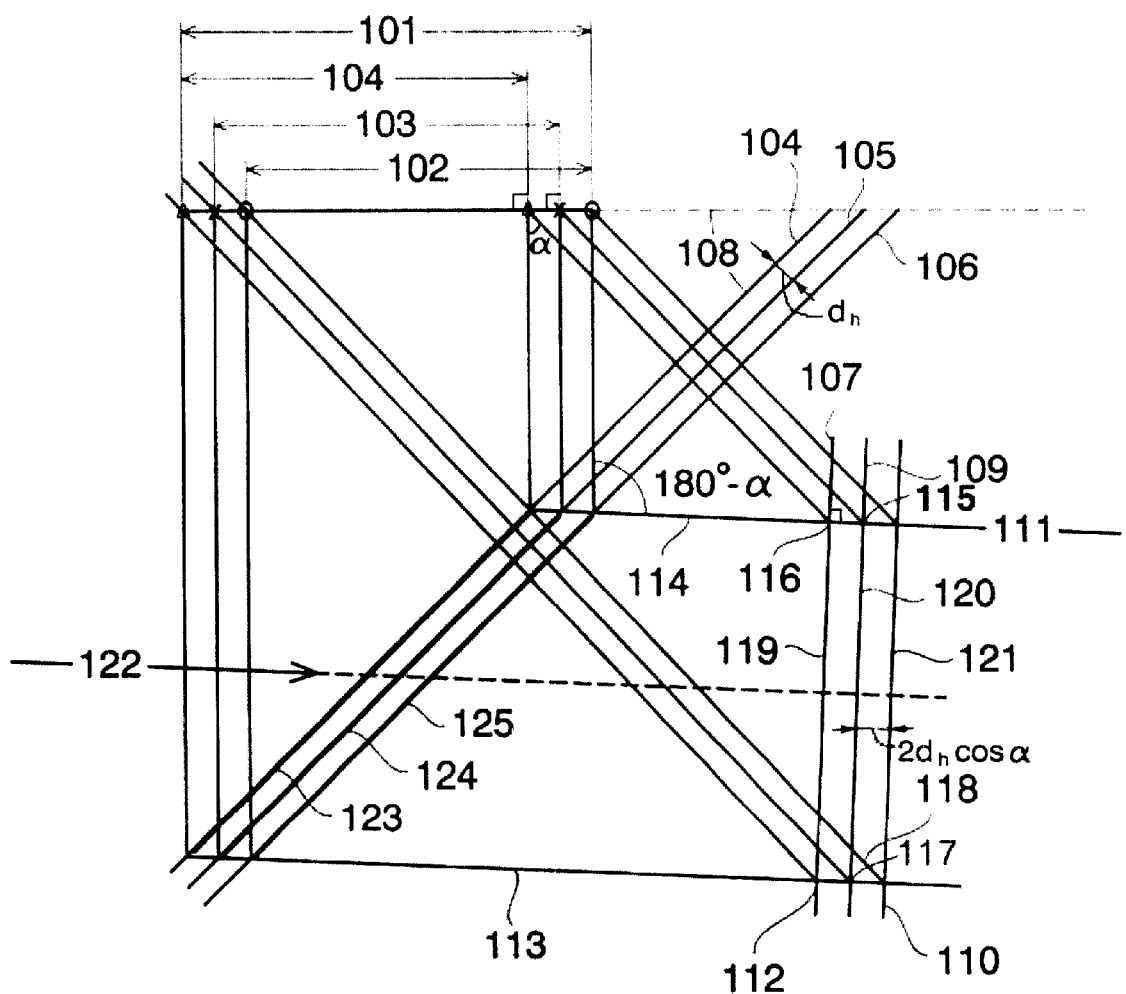
FIG. 5 shows the construction of a multi-layer image display system according to the third embodiment of the invention.

FIG. 5 shows that the layer image is reflected from the high speed image display unit and the reflector or half mirror to form the multi-layer image in the multi-layer image display system according to the third embodiment. First, an image of a straight line 101 by the first reflector or half mirror 104 arranged at the angle 108 of α at a predetermined distance with the straight line 101 is given to a straight line 107 symmetric about the reflector or the half mirror of the straight line 101. An image of the straight line 101 by the second reflector or half mirror 105 distanced in parallel from the reflector or half mirror 104 at an interval $d_h$ is given to a line 109 distanced in parallel from the straight line 107 at an interval $2d_h \cos\alpha$. An image of the straight line 101 by the third reflector or half mirror 106 distanced in parallel from the reflector or half mirror 105 is given to a straight line 110 distanced in parallel from the straight line 109 at an interval $2d_h \cos\alpha$.

Portions where the straight lines 107, 109 and 110 overlap with one another are shown as segments of line 119, 120 and 121, which are defined by points 115 and 116 where a straight line 114 perpendicularly drawn to the straight lines 109 and 107 at the upper end 111 of the straight line 110 meets the straight lines 109 and 107, points 117 and 118 where a line 113 perpendicularly drawn to the straight lines 109 and 110 at the lower end 112 of the straight line 107 meets the straight lines 109 and 110. When the user sees the overlapped portions along the front direction 112, it can be seen that three segments of line with the same length are arranged in parallel along the depth.

The portions where the images of the straight line 101 by the reflector or half mirror 104, 105 and 106 overlap with one another correspond to positions in the straight line 101. Namely, the segment 119 is given to a segment 104 defined by symbols △—△, and the segment 121 is given to a segment 103 defined by symbols ○—○. Also, a distance a among the symbols satisfies a=2$d_h$ sin α.

Portions 123, 124 and 125 of the reflectors or half mirrors 104, 105 and 106 defined by extended lines from the lines 113 and 114 meeting the reflectors or half mirrors 104, 105 and 106 become the minimum reflector or half mirror sizes necessary for forming the overlapped portions 119, 120 and 121. Also, the sizes are given as the value of dividing the overlapped portions 119, 120 and 121 with cos α. If it is assumed that the line 101 indicates one side of an image display surface of the image display unit, when the layer images are displayed in the range by the segments 104, 103 and 102 and reflected through the corresponding reflectors or half mirrors, a three-layered multi-layer image can be generated.

Figure 6:
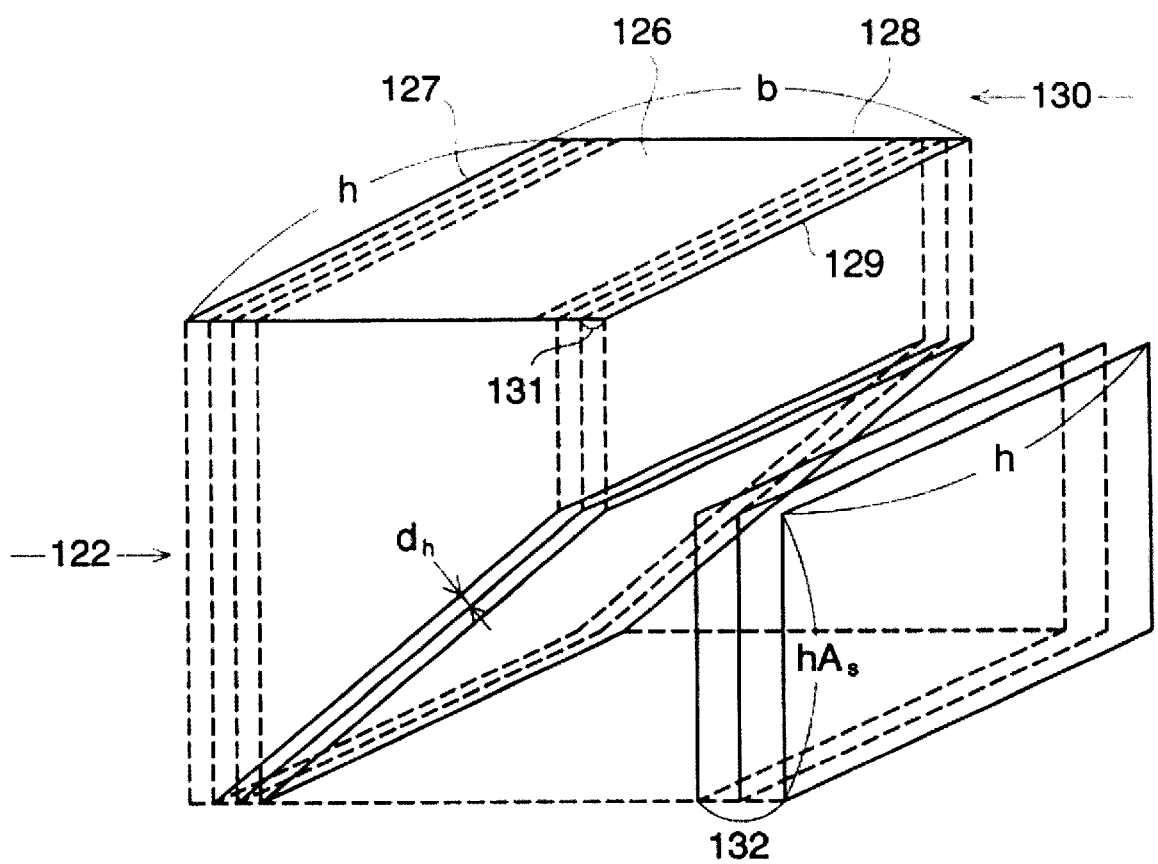
FIG. 6 three-dimensionally shows the construction shown in FIG. 5.

In general, the size of the image display surface necessary for generating a volumetric image composed of an n-layer of multi-layer image can be calculated by using FIG. 6, which three-dimensionally shows FIG. 5. If the length of horizontal side 127 of an image display surface 126 is w, a vertical width should be $A_s$W to display an image having an aspect ratio $A_s$. Since the vertical side length should have the size of 2α+$A_s$w in order to display an image sized w×$A_s$w while transferring the image display surface 126 from the upper side 129 to the downward direction 130 at a predetermined interval 131 sized a, the vertical side 128 sized b of the image display surface 126 should satisfy conditions expressed in Equation 4 for n times of display:

$$b \geq (n-1)a + A_s w = 2(n-1)d_h \sin \alpha + A_s w \qquad \text{Equation 4.}$$

A resultant layer image 132 has n-layer of images which are overlapped at an interval 2$d_h$ cos α and respectively sized of w×$A_s$w. If α is 45°, the transfer interval a of the image display surface for generating the images according to layers is the same as the interval among the layer images, in which a is given as $\sqrt{2}d_h$.

Figure 7:
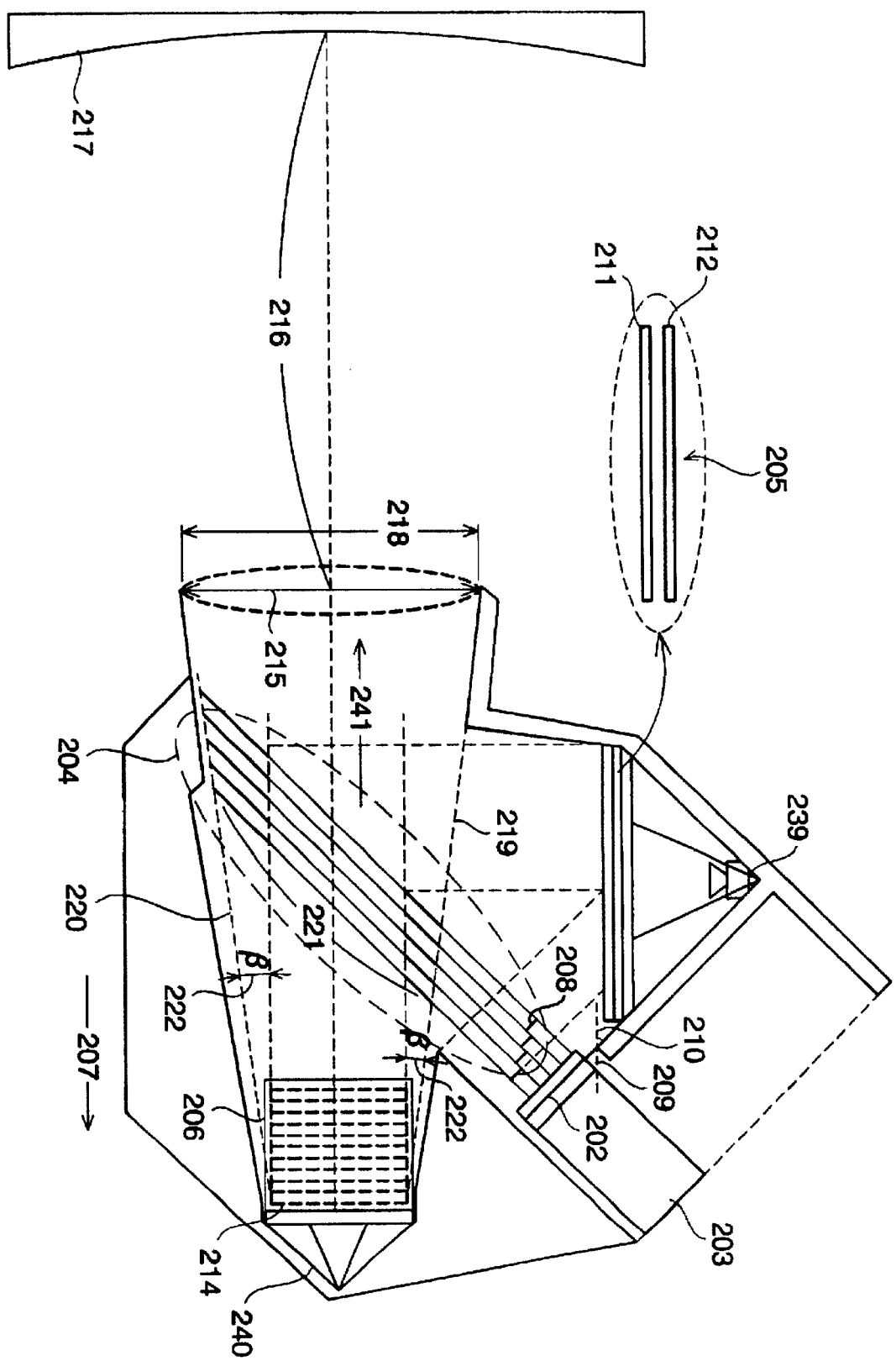
FIG. 7 shows the cross sectional view of the multi-layer image display system according to FIG. 6.

FIG. 7 shows the cross sectional view of the multi-layer image display system using the principle for generating a multi-layer image according to FIG. 6.

The multi-layer image display system 201 includes a reflecting device 204 having five fan-shaped reflectors or half mirrors mounted to a rotary device 203 and attached in the perpendicular direction 209 at a predetermined interval 208 of $d_h$ along the rotary axis 202. The reflecting device 204 rotates at 90°−α with respect to a horizontal plane 207, for reflecting an image of image display devices 211 and 212 along a forward direction 241, an image display unit 205 placed at an angle 210 or a with respect to the reflecting device 204, and a light source unit 239 for illuminating the image display unit 205, in which a layer image 206 is observed as appears on the right of the reflecting device 204.

The image display unit 205 can cause at least two layers of layer images to be generated by each reflector or half mirror in the reflecting device 204 by overlapping the first image display device 211 with the second image display device 212 with the same size as the first image display device 211 at an interval 2$d_h$ cos α.

Each layer image is displayed while the image display position is transferred for 2$d_h$ sin α in the image display unit 205 and the second image display device 212. When the center of the image is completely aligned with the center of the corresponding reflector or half mirror, the light source unit 239 is irradiated allowing the image of the image display unit 205 to be sent to the reflecting device 204.

Also, in the multi-layer image display system according to the third embodiment, at least one image display device 213 sized w×$A_s$w can be installed 2$d_h$ cos α rearward of the position where the last layer image 214 appears with an interval 2$d_h$ cos α, so that the layer number of the layer image composing the multi-layer image can be increased through a layer image increasing unit. In this case, the reflector cannot be used while use of the half mirror is essential, and a multi-layer image light source unit 240 for irradiating the stereoscopic image which is synchronized with the same period as the image display light source unit 239 so that the stereoscopic image composed of the multi-layer image obtained through the layer image increasing unit may be transferred to the user.

Since the multi-layer image display system includes a high speed rotation mechanism which revolves 60 times per second for generating the layer image, the rotary device 203 is preferred to be small in size. In order to reduce the size of the rotary device 203, the reflecting device 204 and finally image display unit should be reduced in size. Therefore, it is required an apparatus for expanding the image.

In order to expand the layer image, the expanding device for expanding the image includes the use of a projection objective 215 to project on a global mirror 217, a lens or a holographic screen having the same features as the mirror 217 or the lens spaced at a predetermined distance 216.

The user watches the stereoscopic image at the position where the image of the projection objective 215 is formed by the global mirror 217, the lens or the holographic screen having the same features as the mirror 217 or the lens. In expanding the stereoscopic image, the image expansion is varied along the depth and in the vertical and horizontal directions, and therefore, it should be considered to compensate the variation in an image displaying process.

In the case of expanding the layer image, the minimum size 221 of each reflector or half mirror in the reflecting means 204 is not given $A_s$w/cos α. Instead, it should be the same as the length traversing at the angle α between the lines 219 and 220 for connecting an output opening of the projection objective 215 and the upper and lower end points of the image display device 213. If it is smaller than this, an image of the reflector or half mirror itself may be unfavorably observed by the user. Thus, the vertical width of each reflector or half mirror increases as it approaches the projection objective 215. However, since the reflecting device 204 is perpendicularly attached to the rotary axis 202 which rotates with an angle 90°−α to the horizontal plane 207, if an angle 222 or β of the lines 219 and 220 with the horizontal plane 207 is smaller than 90°−α, the radius of each fan-shape area decreases as approaching the projection objective 215.

Figure 8:
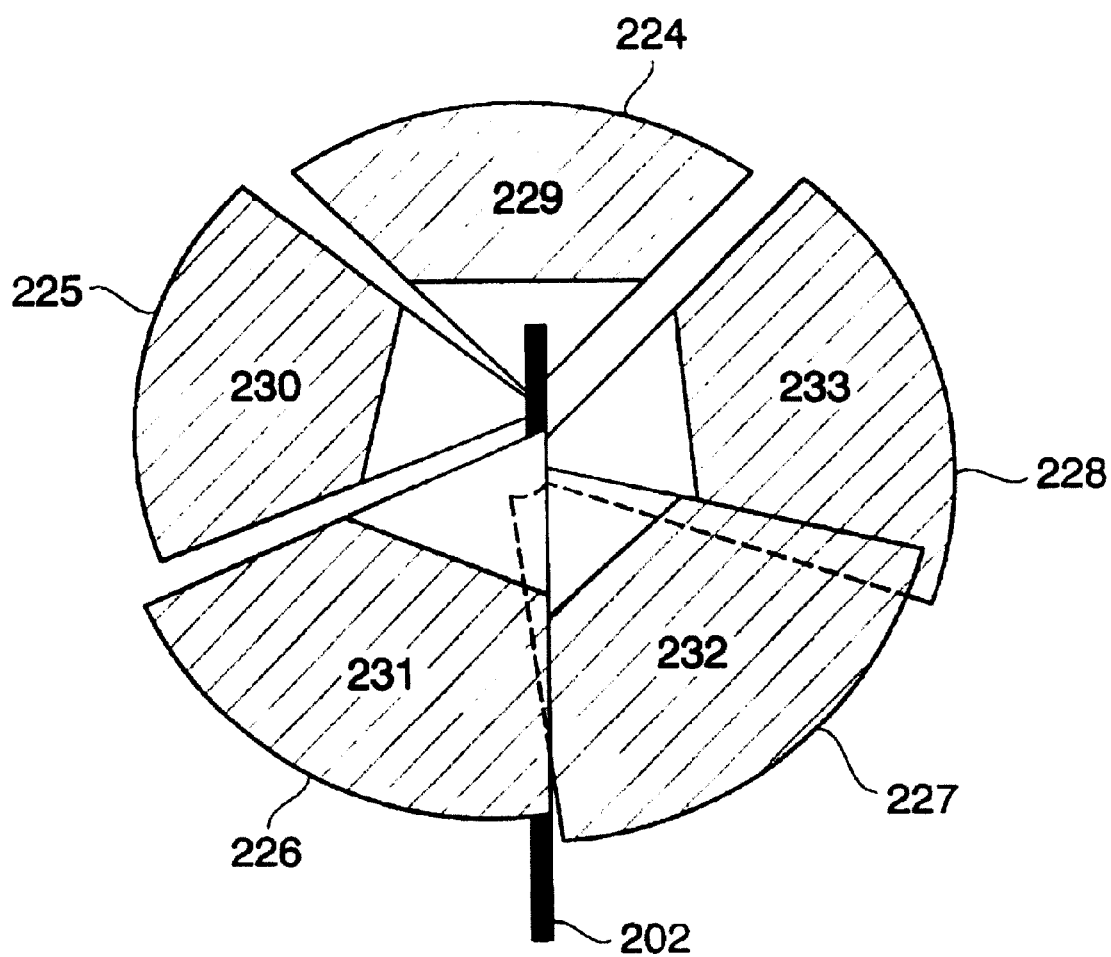
FIG. 8 shows the construction of a reflecting means shown in FIG. 5.
Figure 9:
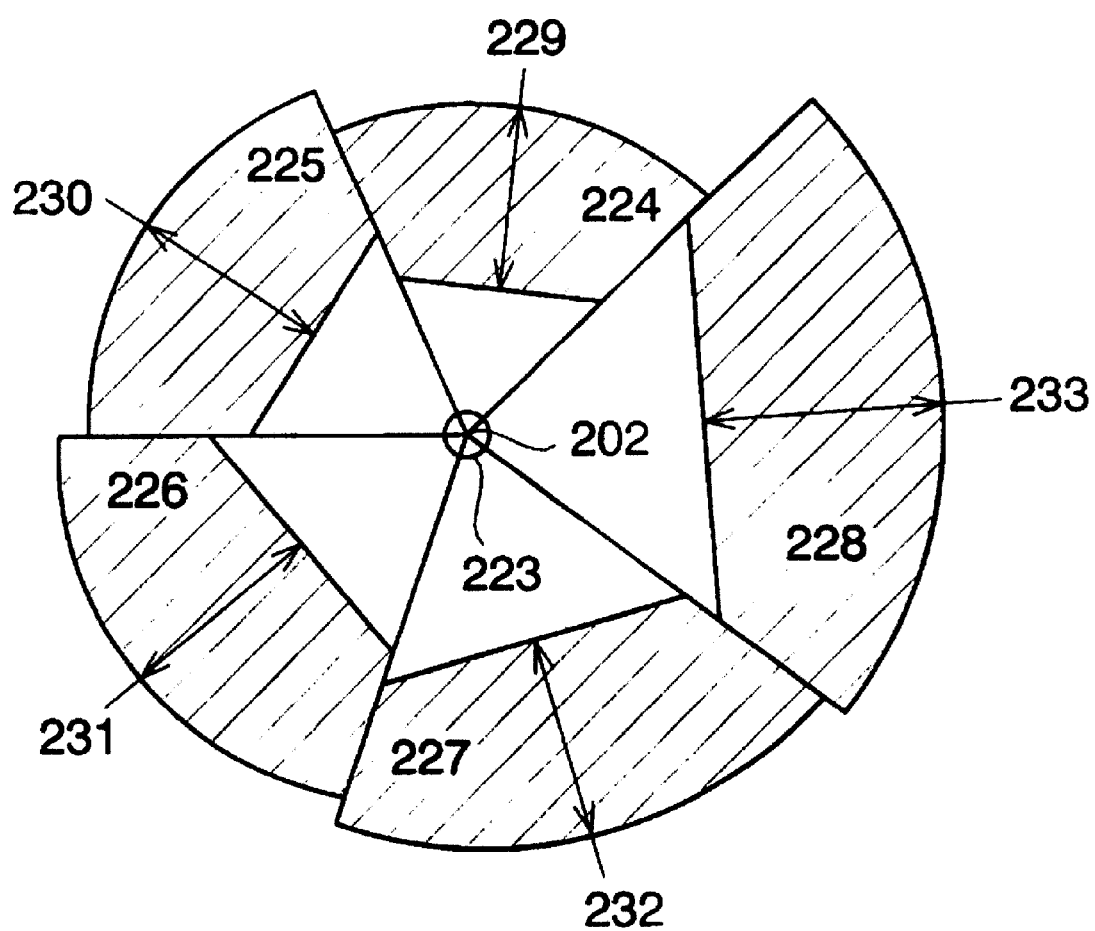
FIG. 9 is a plan view of the reflecting means shown in FIG. 8.

FIG. 8 and FIG. 9 show the reflector or half mirror composing the reflecting device shown in FIG. 7.

The reflectors or half mirrors of the reflecting device should not overlap with each other, and thus have a fan-shaped configuration in which one circle is divided with a predetermined central angle. Therefore, the reflector or the half mirrors share the rotary axis, and five fan-shaped areas 224 to 228 mutually different in radius are arranged in parallel at a predetermined distance without overlapping with the central angle 223 being 72°. The radius of each fan-shape area increases as it approaches the fan-shaped area 228 (counter clockwise from the fan-shaped area 224, and the increasing rate thereof is determined by the angles α and β shown in FIG. 7.

Each fan-shaped area on the rotary axis is positioned at a predetermined interval 208, in which the fan-shaped area 228 with the largest radius is in the lowest position and the fan-shaped area 224 with the smallest radius is in the highest position. If the angle β is larger than α, the fan-shaped area 224 has the largest radius and the fan-shaped area 228 has the smallest radius. If the angle β is the same as α, each fan-shaped area has the same radius. In the widths 229, 230, 231, 232 and 233 of the reflector or half mirror coated portions or hatched portions in the fan-shaped areas, the width 229 is the largest and the width 233 is the smallest. The size of each fan-shaped area should satisfy the foregoing Equation 1 and Equation 2.

Figure 10:
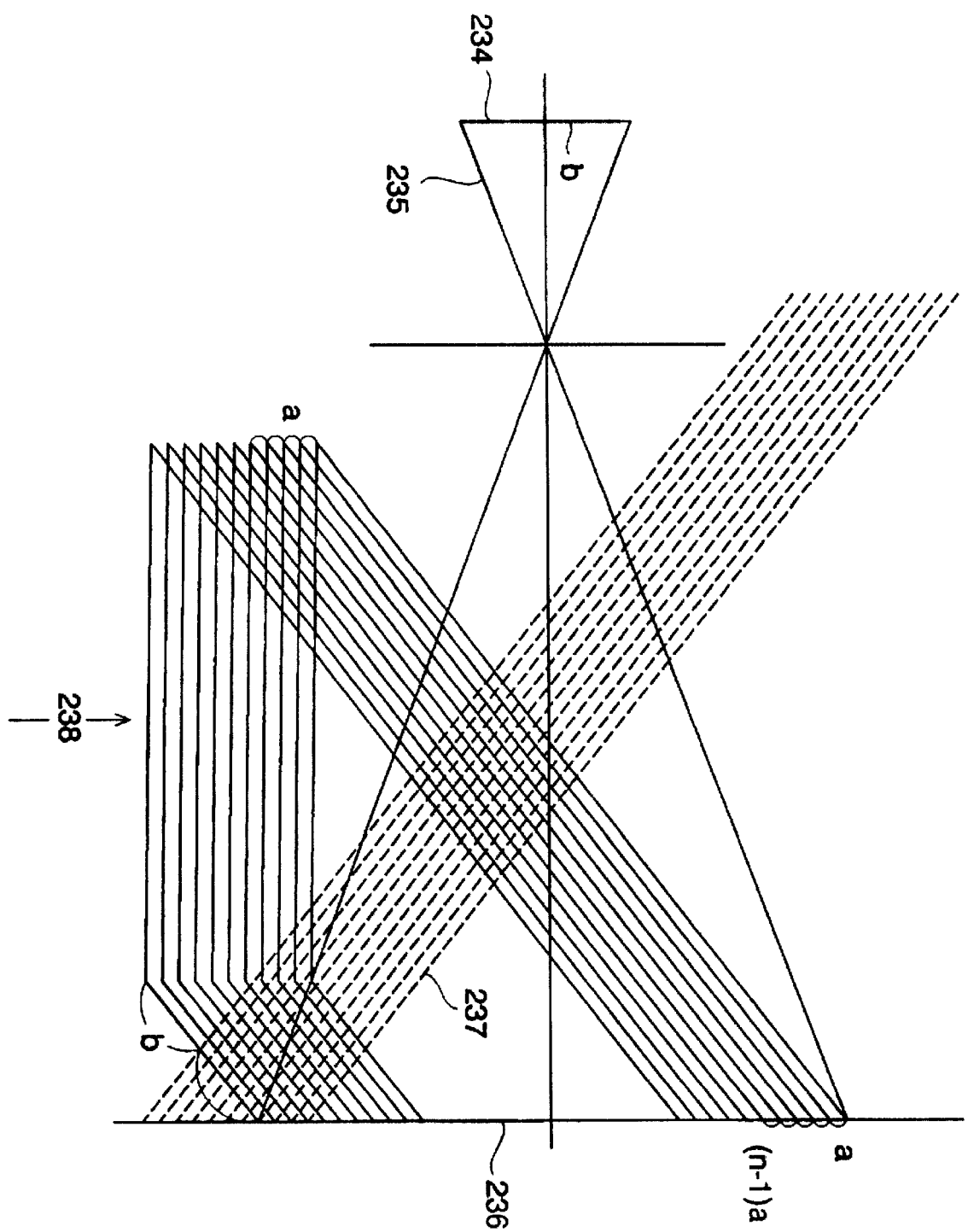
FIG. 10 shows the principle of an expanding means applicable to FIG. 5.

As one more method for expanding the layer image, an expanded layer image is obtained by previously expanding the image in the image display unit 205 rather than expanding the layer image formed as in FIG. 8 and FIG. 9. FIG. 10 shows a method for obtaining an expanded layer image.

When an image display device 234 is expanded through a lens 235 and a half mirror 237 is placed at a predetermined interval between a lens 235 and an expanded image 236, the expanded layer image can be seen if watching the half mirror in the direction 238 opposed to the reflecting direction of rays from the lens by the half mirror.

The multi-layer image display system and method thereof of the invention configured as above relate to the method in which the liquid crystal type image display units for displaying the images according to depth necessary for obtaining the stereoscopic image are arranged according to layers at a predetermined interval without overlapping each other along the rotary axis and rotated as displayed the layer image corresponding to each image display unit, by which the screen is on to express the stereoscopic image when each image display unit arrives at the user's position; and the method in which the reflector or half mirror is installed instead of the image display unit and the layer image corresponding to the relative depth of the reflector or half mirror is synchronized with the rotation speed to express the stereoscopic image in the fixed high speed display device. The stereoscopic image obtained by the multi-image capable of corresponding to the four optical functions of the eyes such as binocular parallax and moving parallax for providing the first depth recognition function of the eyes and convergence and accommodation for providing the fine depth recognition function used for recognizing the relative position of the specific image according to depth more correctly, so that fatigue of the eyes incurred in watching the stereoscopic image can be prevented.

What is claimed is:

1. A multi-layer image display system comprising:
    a rotary axis;
    a plurality of rotatable, fan-shaped plates being arranged in sequence about the rotary axis, said plurality of plates being arranged with each other and spaced vertically with respect to the rotary axis at a predetermined height interval about the rotary axis, and wherein said plates are arranged in parallel with respect to a direction perpendicular to the rotary axis, and said plates have a common central angle without overlapping with each other;
    a plurality of image display units mounted to said plurality of plates toward a user side for displaying a multi-layer image; and
    a plurality of light source units being arranged in positions in optical alignment with said plurality of image display units about said plurality of plates for illuminating said image display unit, wherein said light source units are arranged on a side of the rotatable plates opposite to the user side.

2. The multi-layer image display system according to claim 1, further comprising a window formed at a periphery of the multi-layer image display system, wherein said plurality of plates reach a position corresponding to the window formed at a periphery of the multi-layer image display system, whereby a user can view the multi-layer image.

3. The multi-layer image display system according to claim 1, wherein the central angle of each of said plates totals 360° when multiplied with the number of said plates.

4. The multi-layer image display system according to claim 1, wherein said plurality of plates are shaped as a fan, and a side of the image displayed on said image display units is perpendicular to a central radius of each of said fan-shaped plates, wherein the maximum size of said image display units satisfies the following equation:

$$w = \frac{r}{\sqrt{A_s^2 + A_s \cot\xi + (\csc^2\xi)/4}},$$

wherein w is the horizontal width of the image display units, $A_s$ is aspect ratio of the image display units, r is the length of sides from the rotary axis of said plates, and $\xi$ is ½ of the central angle of said plates.

5. The multi-layer image display system according to claim 1, wherein said plurality of plates are shaped as a fan, and a side of the image displayed on said image display units is parallel with a central radius of each of said fan-shaped plates, wherein the maximum size of said image display units satisfies the following equation:

$$w = \frac{r}{\sqrt{1 + A_s \cot\xi + (A_s/2)^2 \csc^2\xi}},$$

wherein w is the horizontal width of the image display units, $A_s$ is aspect ratio of the image display units, r is the length of sides from the rotary axis of said plates, and $\xi$ is ½ of the central angle of said plates.

6. The multi-layer image display system according to claim 1, wherein said image display units display at least a portion of layer images corresponding to the relative positions of said plates from the layer images sampled according to depth from a multi-layer image to be displayed.

7. The multi-layer image display system according to claim 1, wherein said light source units illuminate said image display units so that images of said image display units are outwardly outputted through a window provided at a periphery of the multi-layer image display system when said image display units arrive as said plates rotate to the position corresponding to the window so that a user can see a multi-layer image.

8. A multi-layer image display system comprising:
    a rotary axis;
    a plurality of fan-shaped plates rotating in sequence about the rotary axis, said plurality of plates being arranged with each other and spaced vertically with respect to the rotary axis at a predetermined height interval about the rotary axis, and wherein said plates are arranged in parallel with respect to a direction perpendicular to the rotary axis, and said plates have a common central angle without overlapping with each other;

an image projection screen unit mounted to said plurality of plates for allowing an image to be projected; and a plurality of projectors for projecting the image to said image projection screen unit.

9. The multi-layer image display system according to claim 8, further comprising a window formed at a periphery of the multi-layer image display system, wherein said plurality of plates reach a position corresponding to the window formed at the periphery of the multi-layer image display system, whereby the user can see the multi-layer image.

10. The multi-layer image display system according to claim 8, wherein the central angle of each of said plates totals 360° when multiplied with the number of said plates.

11. The multi-layer image display system according to claim 8, wherein said plurality of plates are shaped as a fan, and a side of the image displayed on said image display units is perpendicular to a central radius of each of said fan-shaped plates, wherein the maximum size of said image display units satisfies the following equation:

$$w = \frac{r}{\sqrt{(A_s/\cos\alpha)^2 + A_s\cot\xi/\cos\alpha + (\csc^2\xi)/4}},$$

wherein w is the horizontal width of the image display units, $A_s$ is aspect ratio of the image display units, r is the length of sides from the rotary axis of said plates, and $\xi$ is ½ of the central angle of said plates, and wherein $\alpha$, which is defined on the plane bisecting the horizontal width w, is an angle between the central axis of projection objectives of said projectors passing through the center of the displayed image and the line perpendicular with the plate where the image is displayed.

12. The multi-layer image display system according to claim 8, wherein said plurality of plates are shaped as a fan, and a side of the image displayed on said image display units is parallel with a central radius of each of said fan-shaped plates, wherein the maximum size of said image display units satisfies the following equation:

$$w = \frac{r}{\sqrt{1 + A_s\cot\xi/\cos\alpha + (A_s/2\cos\alpha)^2\csc^2\xi}},$$

wherein w is the horizontal width of the image display units, $A_s$ is aspect ratio of the image display units, r is the length of sides from the rotary axis of said plates, and $\xi$ is ½ of the central angle of said plates, and wherein $\alpha$, which is defined on the plane bisecting the horizontal width w, is an angle between the central axis of projection objectives of said projectors passing through the center of the displayed image and the line perpendicular with the plate where the image is displayed.

13. The multi-layer image display system according to claim 8, wherein each of said projectors includes a driving shutter unit which is positioned on an optical axis of a projection objective and turned on/off so that the image may be projected to the corresponding one of said image projection screen units when the central point of said corresponding image projection screen unit is aligned with the optical axis of the projection objective.

14. The multi-layer image display system according to claim 8, wherein said projectors project at least a portion of layer images corresponding to the relative positions of said plates from the layer images sampled according to depth from a multi-layer image to be displayed.

15. A multi-layer display system comprising:

a plurality of image display units for collectively displaying a multi-layer image, said multi-layer image including a plurality of layer images;

a reflecting device for reflecting the layer images, whereby the layer images displayed from said image display units are obtained in a multi-layered manner so that a user can stereoscopically see the layer image; and a rotary device for rotating said reflecting device to sequentially reflect the plurality of layer images displayed on said plurality of image display units.

16. The multi-layer display system according to claim 15, further comprising:

an image display light source unit for illuminating said image display units so that the images of the image display units reach said reflecting device; and a multi-layer image light source unit for illuminating the multi-layer image so that a user can see the multi-layer image obtained in a multi-layered manner through said reflecting device as synchronized with said image display light source unit.

17. The multi-layer display system according to claim 15, wherein said reflecting device includes a plurality of reflectors which are rotated by said rotary device and reflect the respective layer images of the corresponding image display units so that the plurality of layer images displayed on said plurality of image display units may be sequentially reflected.

18. The multi-layer display system according to claim 15, wherein said reflecting device includes a plurality of half mirrors which are rotated by said rotary device and transmit the respective layer images of the corresponding image display units so that the plurality of layer images displayed on said plurality of image display units may be sequentially reflected.

19. The multi-layer display system according to claim 15, wherein said reflecting device includes a plurality of fan-shaped plates defining a circle without overlapping with one another about the rotary axis.

20. The multi-layer display system according to claim 19, wherein a longitudinal width and a lateral width of said image display unit for generating n-layers of layer images satisfy the following equation:

$$b \geq (n-1)a + A_s w = 2(n-1)d_h \sin\alpha + A_s w,$$

wherein w is the lateral width, b is the longitudinal width, $A_s$ is the aspect ratio of the layer image, $d_h$ is the vertical interval between the fan-shaped plates, $\alpha$ is the angle between the fan-shaped plates and the image display unit.

21. The multi-layer display system according to claim 20, wherein the layer images of said image display units reflected through said reflecting device is displayed with the longitudinal display position being transferred at an interval of $2d_h \sin\alpha$.

22. The multi-layer display system according to claim 19, wherein the central radii of said plurality of fan-shaped plates successively increase toward a direction parallel with the rotary axis.

23. The multi-layer display system according to claim 20, wherein said image display units have a plurality of liquid crystal image display devices of the same size placed at an interval of $2d_h \cos \alpha$ so that the number of said fan-shaped plates increase at least two times.

24. The multi-layer display system according to claim 20, further comprising a layer image increasing unit composed of an image display device positioned rearward of the plurality of layer images reflected through said reflecting device so that the number of layers of the layer images obtained in a multi-layered manner as reflected through said reflecting device may increase.

25. The multi-layer display system according to claim 24, wherein said image display devices include at least one liquid crystal image display device arranged $2d_h \cos \alpha$ rearward of a position of the layer image formed in the last of the plurality of layer images with an interval of $2d_h \cos \alpha$ and with the same size as the layer image.

26. The multi-layer display system according to claim 15, further comprising an expanding device for expanding the multi-layer image so that the multi-layer image obtained by said reflecting device may be expanded and transferred to the user.

27. The multi-layer display system according to claim 26, wherein said expanding device further comprises:
  a lens unit positioned between said multi-layer image and a position for a user for expanding the multi-layer image to be transferred to the user; and
  a screen for a multi-layer image, wherein the multi-layer image expanded through said lens unit is formed on said screen.

28. A method for displaying a multi-layer image, comprising the steps of:
  (a) generating the multi-layer image, wherein the multi-layer image is sampled from a stereoscopic image according to depth to display the stereoscopic image;
  (b) displaying layer images collectively forming the multi-layer image generated in said step (a) to image display units mounted to a plurality of rotary plates being arranged at varying intervals according to depth and without overlapping; and
  (c) stereoscopically transferring the images of the image display units to a position for displaying the multi-layer for a user.

29. The method for displaying a multi-layer image according to claim 28, wherein the plurality of plates sequentially rotate with a time difference of 1/60N in said step (b) when the layer number of the multi-layer image is N.

30. The method for displaying a multi-layer image according to claim 29, wherein the time difference of 1/60N is changed according to brightness of the image display units.

31. The method for displaying a multi-layer image according to claim 28, wherein the image display units reach a position corresponding to a window provided at a periphery for allowing a user to see the multi-layer image as the plates rotate, wherein said step (c) comprises the step of illuminating the image display unit so that the image of the image display units may be outwardly outputted through the window.

32. A method for displaying a multi-layer image, comprising the steps of:
  (a) generating the multi-layer image, wherein the multi-layer image is sampled from a stereoscopic image according to depth for displaying the stereoscopic image;
  (b) projecting from a plurality of projectors layer images according to depth so that the layer images forming the multi-layer image generated in said step (a) are generated with a depth difference; and
  (c) stereoscopically transferring the layer images to a position for viewing by a user as a plurality of image projection screen units corresponding to a plurality of projectors rotate without overlapping with one another and the layer images projected from the projectors are formed on the image projection screen units.

33. The method for displaying a multi-layer image according to claim 32, wherein the projectors project the layer images in said step (b) when the centers of the image projection screen units corresponding to the projectors are aligned with an optical axis of projection objectives of the projectors.

34. The method for displaying a multi-layer image according to claim 32, wherein the plurality of projectors have an angle for projecting the images to the image projection screen units in a range where keystone distortion is not created, and said projectors project the layer images to the image projection screen unit.

35. A method for displaying a multi-layer image, comprising the steps of:
  (a) generating the multi-layer image, wherein the multi-layer image is sampled according to depth from a stereoscopic image to express the stereoscopic image;
  (b) displaying layer images forming the multi-layer image on image display units;
  (c) reflecting the layer images displayed in said step (b) through a plurality of reflective devices rotating without overlapping; and
  (d) stereoscopically transferring the layer images to a position for viewing by a user as the layer images are reflected through the plurality of reflective devices in said step (c) and obtained in a multi-layered manner.

36. The method for displaying a multi-layer image according to claim 35, wherein the layer images are displayed on the plurality of image display units in said step (b) so that the layer images of the multi-layer image to be obtained may increase.

37. The method for displaying a multi-layer image according to claim 35, wherein said step (c) comprises the step of illuminating the layer image so that the layer image displayed on the image display unit may be introduced to the reflective devices.

38. The method for displaying a multi-layer image according to claim 35, wherein said step (d) comprises the step of illuminating the layer images so that the layer images may be stereoscopically transferred to a position for viewing by the user.

39. The method for displaying a multi-layer image according to claim 35, wherein said step (c) comprises the step of primarily expanding the layer images in the image display units in said step (b) which are reflected through the reflective devices.

40. The method for displaying a multi-layer image according to claim 35, wherein said step (d) comprises the step of secondly expanding the layer images obtained in a multi-layered manner so that the expanded layer images may be transferred to a position for viewing by a user.

* * * * *